M. G. Tousley,
Nose Ring,
Nº 68,131. Patented Aug. 27, 1867.
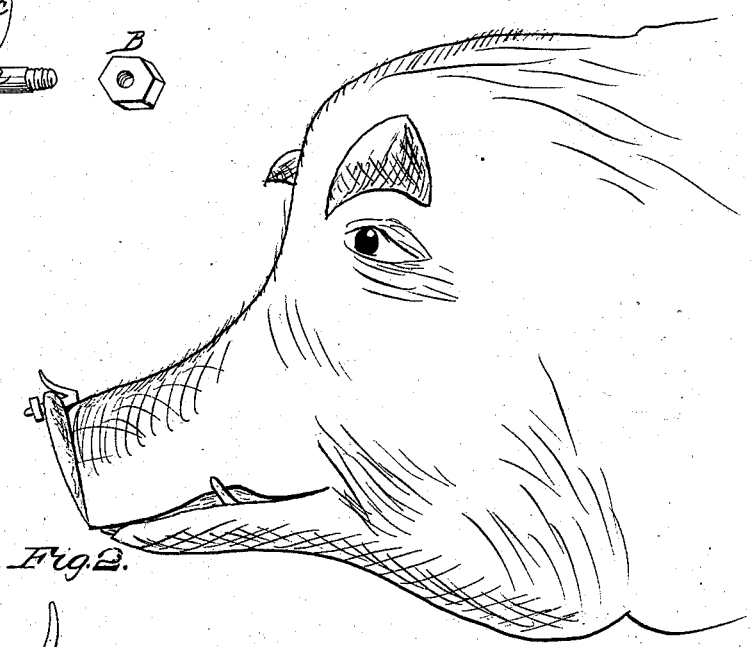
Witnesses:
W. W. Sanborn
G. R. Booth
Inventor:
Miron G. Tousley

United States Patent Office.

MIRON G. TOUSLEY, OF FULTON, ASSIGNOR TO ANDREW CHAISER AND JOHN P. CHAISER, OF CORDOVA, ILLINOIS.

Letters Patent No. 68,131, dated August 27, 1867

SNOUT-RING FOR SWINE.

The Schedule referred to in these Letters Patent and making part of the same.

TO ALL WHOM IT MAY CONCERN:

Be it known that I, MIRON G. TOUSLEY, of near Fulton, in the county of Whiteside, in the State of Illinois, have invented a new and useful Implement to be attached to the Snouts of Swine to prevent them from rooting up and destroying pasture lands, of which the following is a full, clear, and exact description, reference being had to the accompanying drawing, that form a part of these specifications, and to the figures and letters of reference marked thereon.

No. 1 drawing represents the implement and its manner of attachment to a swine's snout.

No. 2 drawing shows the implement as it appears when not attached to a swine's snout.

The unnumbered drawings, marked with letters, show the implement in parts.

The implement consists of a hook or angle, and of a nut. The part A forms a bolt to pass downward through the flange or muscle of a swine's snout, and is held in its place by the nut B, while the part C extends to the front and acts as a lever on part A, whenever brought in contact with the ground by the swine's attempting to root. This device effectually prevents swine from rooting without inflicting unnecessary pain, or mutilating them and rendering them liable to disease, and can be removed from the swine's snout at will by simply unscrewing the nut B, thus returning to the swine its liberty to root for worms, mast, and medicinal roots when in feeding-lots or underbrush, as is often desirable.

I will state, for information of those unskilled in the manufacture and use of this implement, that it may be cast or wrought from iron or any other metal, and may be finished by blueing, japanning, galvanizing, or any other desirable process. The bolt part A may be inserted in the swine's snout through a hole cut with a hand-punch, such as saddlers and shoemakers use for punching leather.

What I claim specially as my invention, for which I desire to obtain Letters Patent, is—

The hook or angle combining the lever C, with its means of attachment A, when constructed and used substantially in the manner and for the purpose set forth.

MIRON G. TOUSLEY.

Witnesses:
W. W. SANBORN,
G. J. BOOTH.